US010924174B2

(12) United States Patent
Huang et al.

(10) Patent No.: US 10,924,174 B2
(45) Date of Patent: Feb. 16, 2021

(54) PRECODING MATRIX INDICATION METHOD, APPARATUS, AND SYSTEM

(71) Applicant: Huawei Technologies Co., Ltd., Shenzhen (CN)

(72) Inventors: Yi Huang, Shenzhen (CN); Haibao Ren, Shanghai (CN); Shengyue Dou, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

(21) Appl. No.: 16/401,427

(22) Filed: May 2, 2019

(65) Prior Publication Data

US 2019/0260453 A1 Aug. 22, 2019

Related U.S. Application Data

(63) Continuation of application No. PCT/CN2017/109160, filed on Nov. 2, 2017.

(30) Foreign Application Priority Data

Mar. 24, 2017 (CN) .......................... 2017 1 0184915

(51) Int. Cl.
*H04W 88/02* (2009.01)
*H04B 7/06* (2006.01)
(Continued)

(52) U.S. Cl.
CPC ......... *H04B 7/0639* (2013.01); *H04B 7/0456* (2013.01); *H04B 7/0469* (2013.01);
(Continued)

(58) Field of Classification Search
CPC .. H04B 7/0639; H04B 7/0456; H04B 7/0469; H04B 7/0478; H04B 7/0617; H04B 7/0626; H04L 5/0051; H04W 88/02
See application file for complete search history.

(56) References Cited

U.S. PATENT DOCUMENTS 9,209,877 B2 * 12/2015 Wang .................. H04B 7/0465
10,326,506 B2 * 6/2019 Wang .................. H04B 7/0465
(Continued)

FOREIGN PATENT DOCUMENTS

| CN | 101902312 A | 12/2010 |
| CN | 103039018 A | 4/2013 |

(Continued)

OTHER PUBLICATIONS

Rahman et al. U.S. Appl. No. 62/345,119, filed Jun. 3, 2016 (Year: 2016).*

(Continued)

*Primary Examiner* — Wutchung Chu
(74) *Attorney, Agent, or Firm* — Leydig, Voit & Mayer, Ltd.

(57) ABSTRACT

A precoding matrix indication method relating to the field of wireless communications technologies, an apparatus, and a system that are in a wireless communications system are provided. A combination of a plurality of stages of codebooks and a corresponding PMI feedback method are further provided. User equipment receives indication information sent by a network device, where the indication information includes information about codebooks used to report precoding matrix indicators (PMI), the information about the codebooks indicates that the used codebooks are at least two of a first codebook to an $N^{th}$ codebook, the PMIs include at least two of a first PMI to an $N^{th}$ PMI, and the first PMI to the $N^{th}$ PMI are respectively used to indicate a precoding matrix in the first codebook to a precoding matrix in the $N^{th}$
(Continued)

codebook; and sends the PMIs based on the indication information.

19 Claims, 5 Drawing Sheets

(51) Int. Cl.
*H04B 7/0456* (2017.01)
*H04L 5/00* (2006.01)

(52) U.S. Cl.
CPC ......... *H04B 7/0478* (2013.01); *H04B 7/0617* (2013.01); *H04B 7/0626* (2013.01); *H04L 5/0051* (2013.01); *H04W 88/02* (2013.01); *H04B 7/0619* (2013.01)

(56) References Cited

U.S. PATENT DOCUMENTS

| | | | |
|---|---|---|---|
| 2011/0122968 A1 | 5/2011 | Jöngren et al. | |
| 2013/0114763 A1* | 5/2013 | Park | H04B 7/0469 375/296 |
| 2014/0369279 A1 | 12/2014 | Yu et al. | |
| 2015/0110215 A1* | 4/2015 | Wang | H04B 7/0465 375/267 |
| 2016/0043790 A1 | 2/2016 | Gaal et al. | |
| 2016/0294454 A1 | 10/2016 | Onggosanusi et al. | |
| 2016/0323022 A1* | 11/2016 | Rahman | H04B 7/0469 |
| 2017/0149549 A1 | 5/2017 | Wang et al. | |
| 2017/0279509 A1* | 9/2017 | Rahman | H04B 7/0639 |
| 2017/0279514 A1* | 9/2017 | Rahman | H04B 7/0478 |
| 2017/0310376 A1* | 10/2017 | Jarmyr | H04B 7/0639 |
| 2017/0359811 A1* | 12/2017 | Yamada | H04B 7/0469 |
| 2018/0034519 A1* | 2/2018 | Rahman | H04B 7/0452 |
| 2018/0254813 A1* | 9/2018 | Gao | H04B 7/0632 |

FOREIGN PATENT DOCUMENTS

| | | |
|---|---|---|
| CN | 105024743 A | 11/2015 |
| CN | 105306174 A | 2/2016 |
| JP | 2013534110 A | 8/2013 |
| WO | 2016072389 A1 | 5/2016 |

OTHER PUBLICATIONS

"Overview of eDL-MIMO ," 3GPP TSG-RAN WG4 Meeting #68bis, Riga, Latvia, R4-134751, pp. 1-4, 3rd Generation Partnership Project, Valbonne, France (Oct. 7-11, 2013).

"Linear combination codebook and CSI reporting," 3GPP TSG RAN WG1 Meeting #84bis, Busan, Korea, R1-162693, pp. 1-6, 3rd Generation Partnership Project, Valbonne, France (Apr. 11-15, 2016).

Ericsson, "Details on the unified CSI feedback framework for NR", 3GPP TSG-RAN WG1 #86bis, R1-1609761, Lisbon, Portugal, Oct. 10-14, 2016, 6 pages.

Samsung et al., "WF on Framework for NR MIMO", 3GPP TSG RAN WG1 Meeting #86, R1-16xxxx(R1-168105), Gothenburg, Sweden, Aug. 22-26, 2016, 3 pages.

Huawei et al., "WF on CSI measurement and reporting in NR", 3GPP TSG RAN WG1 Meeting #86, R1-168179, Gothenburg, Sweden, Aug. 22-26, 2016, 3 pages.

Intel et al., "We on the CSI-RS configuration for NR", 3GPP TSG RAN WG1, Meeting #86bis, R1-1610492, Lisbon, Portugal, Oct. 10-14, 2016, 1 page.

Samsung et al., "WF on CSI framework for NR", 3GPP TSG RAN WG1 Meeting #86bis, R1-1610637, Lisbon, Portugal, Oct. 10-14, 2016, 5 pages.

Ericsson et al., "WF on CSI-RS pooling", 3GPP TSG RAN1 #86bis, R1-1610907, Lisbon, Portugal, Oct. 10-14, 2016,1 page.

* cited by examiner

PRECODING MATRIX INDICATION METHOD, APPARATUS, AND SYSTEM

CROSS-REFERENCE TO RELATED APPLICATIONS

This application is a continuation of International Application No. PCT/CN2017/109160, filed on Nov. 2, 2017, which claims priority to Chinese Patent Application No. 201610974387.X, filed on Nov. 3, 2016 and Chinese Patent Application No. 201710184915.6, filed on Mar. 24, 2017, all of which are hereby incorporated by reference in their entireties.

TECHNICAL FIELD

Embodiments of this application relate to the field of wireless communication technologies, and in particular, to a precoding matrix indication method, an apparatus, and a system that are in a wireless communications system.

BACKGROUND

In a wireless network, to coordinate with application of multiple-input multiple-output (MIMO) technologies, a network device usually needs to precode to-be-sent data to reduce interference between different data flows of a same user or data flows of different users, so as to improve system performance. Information required by the network device to perform precoding is usually based on downlink channel measurement information fed back by user equipment. The user equipment performs channel estimation based on a reference signal sent by the network device, selects, based on a channel estimation result, a most appropriate precoding matrix from a codebook that includes a plurality of precoding matrixes, and feeds back the precoding matrix to the network device by using a precoding matrix indicator (PMI). The precoding matrix is used as a reference for precoding downlink data by the network device.

In the prior art, a plurality of codebook sets are usually pre-specified in a system depending on a factor such as a difference between PMI feedback mechanisms or reference signal sending manners, and then user equipment is notified, by using signaling, that which codebook set is to be selected for feeding back a PMI. Wireless scenarios develop continuously and various factors, such as a beam combination weight and a beam polarization direction, of a wireless channel need to be considered in combination for each codebook set; therefore, a plurality of complex codebook sets need to be designed for different scenarios. Each precoding matrix in the codebooks depends on one or more precoding matrix indexes. In addition, in an existing system, usually, a codebook used to feed back a PMI can be determined only through mutual coordination of different higher layer signaling. As a result, a network device needs to send higher layer signaling to instruct the user equipment to use corresponding codebooks in different scenarios, which is not flexible enough. Consequently, signaling overheads are high, and a codebook design is quite complex.

In a wireless network that is being developed continuously, for example, in a new radio (NR) technology, a reference signal resource configuration is more flexible. For example, both periodic and non-periodic PMI reporting are supported, both a non-precoded reference signal and a precoded reference signal are supported, and a reference signal resource includes an antenna port in a multi-panel antenna array, dynamic activation and deactivation resources, and the like. An existing PMI feedback solution cannot satisfy a flexible PMI feedback requirement in the wireless network.

Therefore, a precoding indication method is required, so that different reference signal resource configurations can be flexibly adapted to, and signaling and a codebook design can be simplified.

SUMMARY

This specification describes a precoding indication method, an apparatus, and a system, to improve PMI feedback flexibility by using a plurality of stages of codebooks in a combined manner and by using a corresponding PMI feedback method, so as to support more reference-signal-resource configuration scenarios and reduce signaling overheads used to configure a PMI feedback manner.

According to a first aspect, this application provides a precoding matrix indication method, including: receiving, by user equipment, indication information sent by a network device, where the indication information includes information about codebooks used to report PMIs, the information about the codebooks indicates that the used codebooks are at least two of a first codebook to an $N^{th}$ codebook, the PMIs include at least two of a first PMI to an $N^{th}$ PMI, and the first PMI to the $N^{th}$ PMI are respectively used to indicate a precoding matrix in the first codebook to a precoding matrix in the $N^{th}$ codebook; sending, by the user equipment, the PMIs based on the indication information, where N is an integer greater than or equal to 2. N codebooks and PMIs corresponding to the N codebooks are used, so that one or a combination of a plurality of codebooks of the N codebooks can be used depending on different scenario requirements, for example, different channel state information-reference signal (CSI-RS) resource configurations, to adapt to the different requirements. The network device only needs to indicate, to the user equipment, a specific codebook that needs to be used for a reference signal resource or a specific PMI that needs to be reported for a reference signal resource, thereby avoiding that a plurality of pieces of signaling are required to coordinately instruct the user equipment to use different codebooks and different PMI feedback mechanisms. Therefore, signaling overheads are reduced, and when the reference signal resource or another scenario dynamically changes, only the indication information needs to be sent to correspondingly indicate a change of the used codebook, and there is no need to use a plurality of pieces of signaling to perform coordinate indication for every change. In addition, a relatively simple design may be used for each codebook depending on different consideration factors, and a plurality of codebooks may be used to provide different combination manners for use, so as to adapt to more application scenarios. In this way, there is no need to design a complex codebook set for every scenario, simplifying a codebook design.

In a possible design, the user equipment receives indication information sent by the network device, where the indication information includes information about codebooks used to report PMIs, the information about the codebooks indicates that the used codebooks are at least two of a first codebook, a second codebook, and a third codebook, the PMIs include at least two of a first PMI, a second PMI, and a third PMI, and the first PMI, the second PMI, and the third PMI are respectively used to indicate a precoding matrix in the first codebook, a precoding matrix in the second codebook, and a precoding matrix in the third codebook; and sends the PMIs based on the indication information.

According to a second aspect, this application provides a precoding matrix indication method, including: sending, by a network device, indication information to user equipment, where the indication information includes information about codebooks used by the user equipment to report PMIs, the information about the codebooks indicates that the used codebooks are at least two of a first codebook to an $N^{th}$ codebook, the PMIs include at least two of a first PMI to an $N^{th}$ PMI, and the first PMI to the $N^{th}$ PMI are respectively used to indicate a precoding matrix in the first codebook to a precoding matrix in the $N^{th}$ codebook; and receiving the PMIs sent by the user equipment, where N is an integer greater than or equal to 2.

In a possible design, the method further includes: determining, by the network device for the user equipment, the codebooks used to report the PMIs. Optionally, the determining, by the network device for the user equipment, the codebooks used to report the PMIs includes: determining, by the network device for the user equipment depending on a case about whether a reference signal is precoded and/or distribution of antenna ports in a reference signal resource, the codebooks used to report the PMIs.

In a possible design, the network device sends indication information to the user equipment, where the indication information includes information about codebooks used by the user equipment to report PMIs, the information about the codebooks indicates that the used codebooks are at least two of a first codebook, a second codebook, and a third codebook, the PMIs include at least two of a first PMI, a second PMI, and a third PMI, and the first PMI, the second PMI, and the third PMI are respectively used to indicate a precoding matrix in the first codebook, a precoding matrix in the second codebook, and a precoding matrix in the third codebook; and receives the PMIs sent by the user equipment.

With reference to any one of the first aspect, the second aspect, or the possible implementations of the two aspects, the following paragraphs provide more possible design manners.

Optionally, the indication information may also include information about PMIs that need to be used, the information about the PMIs indicates that the PMIs include at least two of the first PMI to the $N^{th}$ PMI, and the first PMI to the $N^{th}$ PMI are respectively used to indicate the precoding matrix in the first codebook to the precoding matrix in the $N^{th}$ codebook.

Optionally, the indication information may include information about codebooks used to report PMIs corresponding to a plurality of reference signal resources, and different codebooks may be used to report the PMIs corresponding to the reference signal resources. The reference signal resource is at least one antenna port and a time-frequency domain resource that are used to send a reference signal, and one reference signal resource includes at least one antenna port. Signaling overheads are further reduced by using one piece of signaling to notify the user equipment of the codebooks used to report the PMIs corresponding to the plurality of reference signal resources.

In a possible design, values of the first PMI to the $N^{th}$ PMI are respectively corresponding to one codebook index in the first codebook to one codebook index in the $N^{th}$ codebook. One PMI is used for each codebook, and each PMI is corresponding to one codebook index in a codebook, so that the PMIs can be reported by using a simpler information element, fewer bits may be required by the information element, and signaling overheads are reduced during PMI reporting.

In a possible design, values of the first PMI, the second PMI, and the third PMI are respectively corresponding to one codebook index in the first codebook, one codebook index in the second codebook, and one codebook index in the third codebook.

In a possible design, at least one of the first codebook, the second codebook, or the third codebook may further include at least two sub-codebooks. According to the design of further dividing a codebook, a design of each codebook may be simplified, and the codebook may also be used in combination with another codebook more flexibly. Optionally, the first codebook includes a first sub-codebook and/or a second sub-codebook, and the first PMI includes a first sub-PMI and a second sub-PMI. Optionally, values of the first sub-PMI, the second sub-PMI, the second PMI, and the third PMI are respectively corresponding to one codebook index in the first sub-codebook, one codebook index in the second sub-codebook, one codebook index in the second codebook, and one codebook index in the third codebook.

In a possible design, the first codebook to the $N^{th}$ codebook include at least one codebook used for beam selection. Optionally, a precoding matrix in a codebook used for beam selection is a weighting matrix for forming K ($1 \leq K \leq C$) beams by C ($C \geq 1$) antenna ports. The K beams are a group of orthogonal or non-orthogonal bases in a beam space. Different beam sets can be selected by selecting different precoding matrixes from the codebook, so that the user equipment selects a beam set that better adapts to a channel of the user equipment. Optionally, the first codebook may be used for beam selection.

In a possible design, the first codebook to the $N^{th}$ codebook include at least one codebook used for beam basis vector selection. A precoding matrix in a codebook used for beam basis vector selection is a weighting matrix for forming X ($X \geq 1$) beams by C ($C \geq 1$) antenna ports. The X beams are at least one group of orthogonal or non-orthogonal bases in a beam space. Optionally, the first sub-codebook is used for beam basis vector selection, and the second sub-codebook is used for beam selection. A precoding matrix in the second sub-codebook is a selection matrix for selecting K ($1 \leq K \leq C$) beams from X beams.

In a possible design, the first codebook to the $N^{th}$ codebook include at least one codebook used for beam combination. A precoding matrix in a codebook used for beam combination is a weighting matrix for combining at least one beam, for example, a weighting matrix for combining the K beams. Optionally, the second codebook is used for beam combination.

In a possible design, the first codebook to the $N^{th}$ codebook include at least one codebook used for inter-beam amplitude and/or phase compensation. A precoding matrix in a codebook used for inter-beam amplitude and/or phase compensation is a matrix for amplitude and/or phase compensation between different beams. The amplitude and/or phase compensation between different beams includes at least one of amplitude compensation between beams that are in different polarization directions, phase compensation between beams that are in different polarization directions, amplitude compensation between beams from different antenna panels, or phase compensation between beams from different antenna panels. The codebook used for inter-beam amplitude and/or phase compensation may support application of a dual polarization antenna array and/or a multi-panel antenna array. The application of the dual polarization antenna array can be supported, and use of antenna ports or beams that come from different antenna panels can be supported, provided that the codebook and another codebook are used in a combined manner. This simplifies a codebook design. Optionally, the third codebook is used for inter-beam amplitude and/or phase compensation.

According to a third aspect, this application provides a precoding codebook design method. A precoding codebook is used by a network device to perform data precoding and/or by user equipment to report a PMI. The precoding codebook includes N stages of codebooks, where N is an integer greater than or equal to 2, and each of the N stages of codebooks may be independently used or may be used in combination with another codebook.

In a possible design, the N stages of codebooks include at least one of a codebook used for beam basis vector selection, a codebook used for beam selection, a codebook used for beam combination, a codebook used for difference compensation between beams that are in different polarization directions, or a codebook for difference compensation between panels.

In a possible design, the precoding codebook includes three stages of codebooks: a first codebook, a second codebook, and a third codebook. Optionally, the first codebook is used for beam selection. Optionally, the second codebook is used for beam combination. Optionally, the third codebook is used for inter-beam amplitude and/or phase compensation.

In a possible design, the precoding codebook includes four stages of codebooks: a first sub-codebook, a second sub-codebook, a second codebook, and a third codebook. Optionally, the first sub-codebook is used for beam basis vector selection, and the second sub-codebook is used for beam selection. Optionally, the second codebook is used for beam combination. Optionally, the third codebook is used for inter-beam amplitude and/or phase compensation.

According to a fourth aspect, an embodiment of this application provides user equipment, where the user equipment has a function of implementing actions of the user equipment in the foregoing methods in practice. The function may be implemented by hardware, or may be implemented by hardware by executing corresponding software. The hardware or the software includes one or more modules corresponding to the function.

According to a fifth aspect, an embodiment of this application provides a network device, where the network device has a function of implementing actions of the network device in the foregoing methods in practice. The function may be implemented by hardware, or may be implemented by hardware by executing corresponding software. The hardware or the software includes one or more modules corresponding to the function.

According to a sixth aspect, an embodiment of this application provides user equipment, where a structure of the user equipment includes a receiver and a transmitter, the receiver is configured to support the user equipment in receiving the information and/or data sent by the network device in the foregoing methods, for example, receiving the indication information sent by the network device, and the transmitter is configured to support the user equipment in sending the information or data in the foregoing methods to the network device, for example, sending the PMIs to the network device. In a possible implementation, the user equipment may further include a processor, where the processor is configured to support the user equipment in performing corresponding functions in the foregoing methods; and the user equipment may further include a memory, where the memory is configured to be coupled with the processor and store a program instruction and data that may be necessary for the user equipment.

According to a seventh aspect, an embodiment of this application provides a network device, where a structure of the network device includes a transmitter and a receiver, the transmitter and the receiver are configured to support communication between the network device and user equipment, the transmitter is configured to send the information and/or data in the foregoing methods to the user equipment, for example, send the indication information, and the receiver is configured to support the network device in receiving the information and/or data sent by the user equipment in the foregoing methods, for example, receiving the PMIs sent by the user equipment. In a possible design, the network device may further include a processor, where the processor is configured to support the network device in performing corresponding functions in the foregoing methods, for example, determining, for the user equipment, the codebooks used to report the PMIs; or in a possible design, the network device may further include a memory, where the memory is configured to be coupled with the processor and store a program instruction and data that may be necessary for the network device, and the network device may further include a communications unit, configured to support communication with another network device, for example, communication with a core network node.

According to an eighth aspect, an embodiment of this application provides a communications system, where the system includes the network device and the user equipment in the foregoing aspects.

According to a ninth aspect, an embodiment of this application provides a computer storage medium, configured to store a computer software instruction used by the foregoing network device. The computer software instruction includes a program designed for performing the foregoing aspects.

According to a tenth aspect, an embodiment of this application provides a computer storage medium, configured to store a computer software instruction used by the foregoing user equipment. The computer software instruction includes a program designed for performing the foregoing aspects.

According to an eleventh aspect, this application provides a chip system, where the chip system includes a processor, configured to support user equipment in implementing functions in the foregoing aspects, for example, generating or processing the data and/or information in the foregoing methods. In a possible design, the chip system further includes a memory, where the memory is configured to store a program instruction and data that may be necessary for the user equipment, and the chip system may include a chip, or may include a chip and another discrete component.

According to a twelfth aspect, this application provides a chip system, where the chip system includes a processor, configured to support a network device in implementing functions in the foregoing aspects, for example, receiving or processing the data and/or information in the foregoing methods. In a possible design, the chip system further includes a memory, where the memory is configured to store a program instruction and data that may be necessary for the network device, and the chip system may include a chip, or may include a chip and another discrete component.

Compared with the prior art, this application describes a precoding matrix indication method, an apparatus, and a system, to improve PMI feedback flexibility by using a plurality of stages of codebooks in a combined manner and by using a corresponding PMI feedback method, so as to support more reference-signal-resource configuration scenarios and reduce signaling overheads used to configure a PMI feedback manner.

BRIEF DESCRIPTION OF DRAWINGS

The following describes in more details the embodiments of this application with reference to accompanying drawings.

DESCRIPTION OF EMBODIMENTS

The following clearly describes the technical solutions in the embodiments of this application with reference to the accompanying drawings in the embodiments of this application.

A network architecture and a service scenario that are described in the embodiments of this application are intended to describe the technical solutions in the embodiments of this application more clearly, and do not constitute any limitation on the technical solutions provided in the embodiments of this application. A person of ordinary skill in the art may understand that with the evolution of network architectures and the emergence of new service scenarios, the technical solutions provided in the embodiments of this application are also applicable to similar technical problems.

Figure 1:
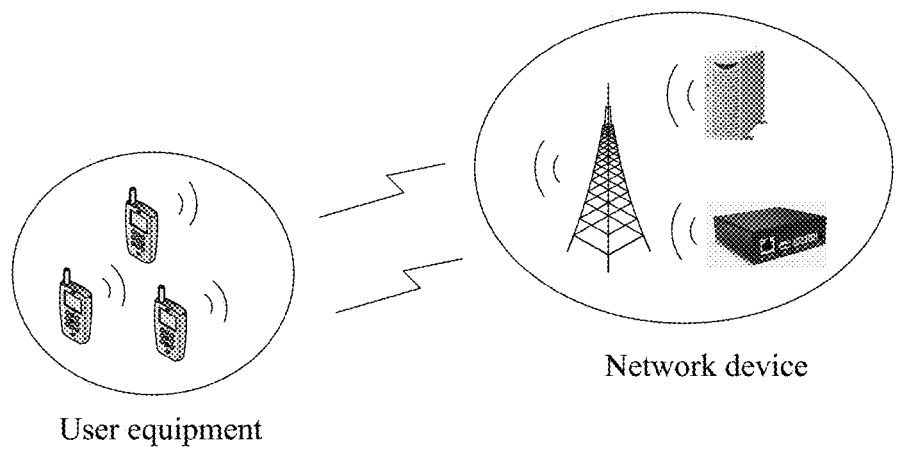
FIG. 1 is a schematic diagram of a possible application scenario according to this application.

Technologies described in this application may be applicable to a Long Term Evolution (LTE) system and a subsequent evolved system such as a 5th generation mobile communications (5G) system, or another wireless communications system in which a precoding technology needs to be used, and in particular, to a communications system that may require flexible precoding matrix indicator (PMI) reporting. FIG. 1 is a schematic diagram of a possible application scenario according to this application. User equipment (UE) accesses, by using a wireless interface, a network device to perform communication, or may communicate with other user equipment, for example, communication in a device-to-device (D2D) or machine-to-machine (M2M) scenario. The network device may communicate with the user equipment, or may communicate with another network device, for example, communication between a macro base station and an access point. In this application, nouns "network" and "system" are usually used alternately, but a person skilled in the art can understand their meanings.

The user equipment in this application may include various handheld devices, in-vehicle devices, wearable devices, computing devices, and control devices that have a wireless communication function, or other processing devices connected to a wireless modem, and various UEs, mobile stations (MS), terminals, and terminal equipment, or the like. For ease of description, the devices are collectively referred to as user equipment (UE).

The network device in this application includes a base station (BS), a network controller, a mobile switching center, or the like. An apparatus that directly communicates with user equipment by using a wireless channel is usually a base station. The base station may include various macro base stations, micro base stations, relay nodes, access nodes, or remote radio units (RRU), or the like. Certainly, another network device that has a wireless communication function may also perform wireless communication with the user equipment. This is not uniquely limited in this application. A device having a base station function may have different names in different systems. For example, the device is referred to as an evolved NodeB (eNB or eNodeB) in an LTE network, the device is referred to as a NodeB in a 3rd generation (3G) network, and the device is referred to as a transmission reception point (TRP) in a subsequent evolved system such as a 5G system.

The technical solutions provided in this application may be applicable between a network device and user equipment, for example, between a base station and user equipment, or may be applicable between other communications devices that need to precode transmission data. For ease of description, a network device and user equipment are used as examples for description in the embodiments of this application.

The following explains some general concepts or definitions in the embodiments of this application. It should be noted that some English abbreviations in this specification are descriptions about the embodiments of this application by using an LTE system as an example and may change with the evolution of the network. For specific evolution, refer to descriptions in a corresponding standard.

An antenna port described in this application is configured to send a physical channel or a signal. A channel that a symbol sent on an antenna port passes through may be obtained through deduction from a channel that another symbol sent on the same antenna port passes through.

A beam described in this application is a radio wave that has a given direction and shape and that is formed in space when at least one antenna port transmits or receives a wireless signal. A beam may be formed through amplitude and/or phase weighting by using data transmitted or received by at least one antenna port, or a beam may be formed by using another method, for example, by adjusting a related parameter of an antenna unit.

An antenna panel (or "panel" for short) described in this application is an apparatus configured to bear a physical antenna. One antenna panel may bear an antenna array that includes a plurality of antenna units, or a plurality of antenna panels may form a multi-panel antenna array.

A reference signal resource described in this application is an antenna port configured to send a reference signal and a time-frequency resource used on the antenna port. One reference signal resource includes at least one antenna port and a time-frequency resource used on the at least one antenna port. Usually, a reference signal used for channel state information measurement, such as a channel state information-reference signal (CSI-RS), is configured in a system. A reference signal used for PMI reporting is usually a CSI-RS, or may be another type of reference signal or another signal. This is not limited in this application. For ease of description, a CSI-RS and a CSI-RS resource are used as examples for description in some embodiments of this application.

A matrix or a precoding matrix described in this application includes a vector that has one row or column.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes the solutions provided in the embodiments of this application in more details with reference to the accompanying drawings.

Figure 2:
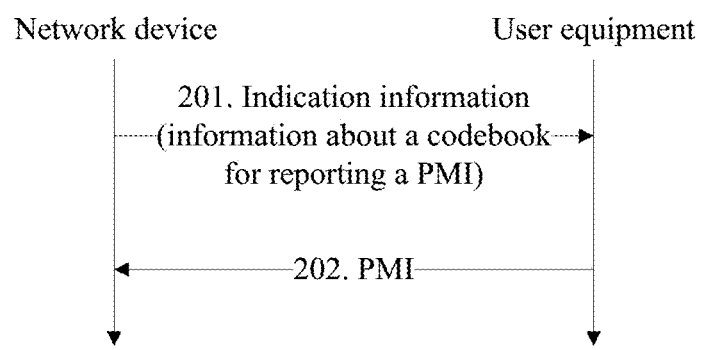
FIG. 2 is a schematic flowchart of a precoding matrix indication method according to an embodiment of this application.

FIG. 2 is a schematic flowchart of a precoding matrix indication method according to an embodiment of this application.

Part 201. User equipment receives indication information sent by a network device, where the indication information includes information about a codebook used by the user equipment to report a PMI.

In an example, the indication information includes a PMI reporting manner corresponding to at least one reference signal resource. Optionally, the reporting manner may be indicating, to the user equipment, the codebook used to report a PMI, or may be indicating, to the user equipment, a specific PMI or specific PMIs that need to be reported. For example, the indication information may indicate, to the user equipment, which codebook or codebooks of a first codebook to an $N^{th}$ codebook need to be used to determine a PMI or PMIs specific to a reference signal resource; or the indication information may indicate, to the user equipment, which PMI or PMIs of a first PMI to an $N^{th}$ PMI need to be reported specific to a reference signal resource. The first PMI to the $N^{th}$ PMI are respectively used to indicate a precoding matrix in the first codebook to a precoding matrix in the $N^{th}$ codebook.

The first codebook to the $N^{th}$ codebook may be designed specific to at least one of a reference signal resource and/or channel information. For example, a codebook is used for beam selection, a codebook is used for beam combination, and a codebook is used for inter-beam amplitude and/or phase compensation. In this way, corresponding to different scenarios, different codebook combinations may be selected for use.

In an example, one PMI is used for each of the first codebook to the $N^{th}$ codebook, and values of the PMIs of the first PMI to the $N^{th}$ PMI are respectively corresponding to one codebook index in the first codebook to one codebook index in the $N^{th}$ codebook. For example, a value of a $k^{th}$ ($1 \leq k \leq N$) PMI may equal a codebook index i ($1 \leq i \leq I$, where I is a maximum value of a codebook index in a $k^{th}$ codebook) in the $k^{th}$ codebook, and therefore the $k^{th}$ PMI indicates a precoding matrix corresponding to the codebook index i in the $K^{th}$ codebook.

In an example, the indication information may be higher layer signaling such as radio resource control (RRC) signaling. Optionally, the indication information may be sent during access of the user equipment, or may be dynamically sent to the user equipment depending on a requirement, for example, a change of a reference signal resource configuration.

In an example, for all different reference signal resources, at least one of the first codebook to the $N^{th}$ codebook is used for PMI reporting, only one codebook set needs to be maintained in a system, or different reference signal resource configurations are used by using flexible combinations of different codebooks.

Part 202. The user equipment reports the PMI based on the indication information.

The user equipment determines, according to the PMI reporting manner indicated in the indication information, the codebook that needs to be used and the PMI, and reports the PMI. For example, if the network device indicates, to the user equipment, that the first codebook and a second codebook need to be used or the first PMI and a second PMI need to be reported, specific to a reference signal resource, the user equipment determines and reports, specific to the reference signal resource, the first PMI and the second PMI by using the first codebook and the second codebook.

Figure 3:
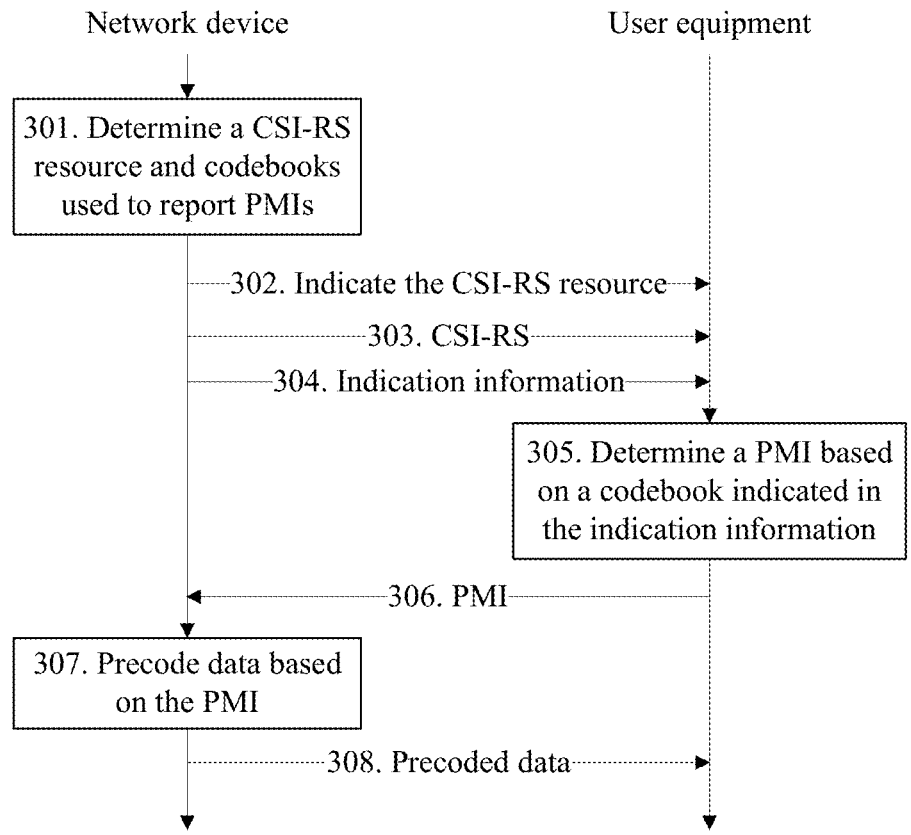
FIG. 3 is a schematic flowchart of a precoding method according to an embodiment of this application.

FIG. 3 is a schematic flowchart of a precoding method according to an embodiment of this application. It should be noted that steps in FIG. 3 and a sequence of the steps are only used as examples, and in an actual system, some steps may be omitted or the sequence may change. This is not limited in this application.

Part 301. A network device determines a CSI-RS resource for user equipment, and determines, for the user equipment, codebooks used to report PMIs specific to different CSI-RSs.

In an example, the network device may determine, for the user equipment depending on a case about whether a CSI-RS is precoded when the CSI-RS is sent and/or distribution of antenna ports in the CSI-RS resource, the codebooks used to report the PMIs. For example, when sending a precoded CSI-RS such as a beamformed CSI-RS, the network device may instruct the user equipment to use a codebook used for inter-beam amplitude and/or phase compensation, and the user equipment may not use a codebook used for beamforming. For another example, when the CSI-RS resource includes antenna ports on different panels, in other words, when beams may come from different antenna panels, the network device may also instruct the user equipment to use a codebook used for inter-beam amplitude and/or phase compensation, so as to perform difference compensation between the beams from the different panels.

Part 302. The network device indicates, to the user equipment, the CSI-RS resource allocated to the user equipment.

In an example, the network device may allocate one or more CSI-RS resources to each user equipment, and the CSI-RS resources may be corresponding to different PMI reporting manners. The network device may dynamically notify the user equipment of a CSI-RS resource configuration.

In an example, one CSI-RS resource may include at least one antenna port and a time-frequency domain resource used on the antenna port. When one CSI-RS resource includes a plurality of antenna ports, these antenna ports may be antenna ports in a same polarization direction or different polarization directions, or may be distributed on a same antenna panel or different antenna panels.

Part 303. The network device sends a CSI-RS, where the user equipment may perform channel estimation and measurement based on the received CSI-RS.

Part 304. The network device sends indication information, where a specific implementation is the same as the description of part 201, and details are not described herein again.

Part 305. The user equipment determines, with reference to a channel estimation and measurement result, a PMI by using a corresponding codebook and based on the indication information.

Part 306. The user equipment reports the PMI, where a specific implementation is the same as the description of part 202, and details are not described herein again.

Part 307. The network device precodes downlink data based on the PMI reported by the user equipment.

Part 308. The network device sends precoded downlink data.

Figure 4:
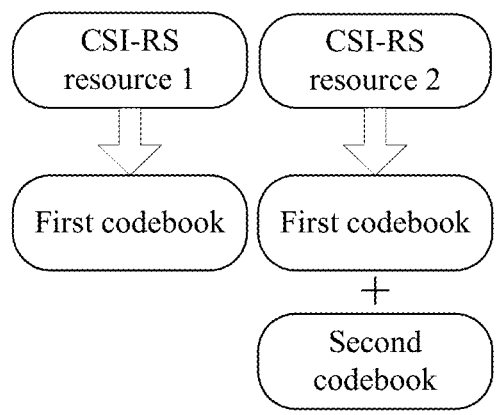
FIG. 4 is a schematic diagram of a correspondence between a reference signal resource and a codebook according to an embodiment of this application.

With reference to the precoding matrix indication method corresponding to FIG. 2 or FIG. 3, FIG. 4 is a schematic diagram of a correspondence between a reference signal resource and a codebook according to an embodiment of this application.

In the embodiment corresponding to FIG. 4, for example, a system includes a first codebook and a second codebook, namely, N=2 is used as an example for description.

A network device may pre-configure an antenna port set of a CSI-RS resource for user equipment. The antenna port set includes M (M≥1) antenna ports, $C_1$ ($C_1$≥1) antenna ports are selected from the port set to form a CSI-RS resource 1, and $C_2$ ($C_2$≥1) antenna ports are selected to form a CSI-RS resource 2.

In this embodiment, the first codebook is used for beam selection. Optionally, a precoding matrix in the first codebook is a weighting matrix for forming K (1≤K≤C) beams by C (C≥1) antenna ports. Different beam sets can be selected by selecting different precoding matrixes from the first codebook, so that the user equipment selects a beam set that better adapts to a channel of the user equipment. Optionally, the precoding matrix in the first codebook may be an over-sampled discrete Fourier transform (DFT) matrix, for example, a precoding matrix corresponding to a first PMI when signaling eMIMO-type is configured as 'Class A' in the 3rd Generation Partnership Project (3GPP) TS 36.211 V13.0.0. The user equipment may select a precoding matrix from the first codebook based on a quantity of antenna ports of a CSI-RS resource and a quantity of beams that need to be selected. Specifically, for the CSI-RS resource 1, selection is performed in a weighting matrix, for forming K (1≤K≤C) beams by $C_1$ antenna ports, in the first codebook; for the CSI-RS resource 2, selection is performed in a weighting matrix, for forming K (1≤K≤C) beams by $C_2$ antenna ports, in the first codebook.

The second codebook is used for beam combination. A precoding matrix in the second codebook is a weighting matrix for combining at least one beam. For example, the second codebook may be a weighting matrix for combining the K beams. Optionally, the precoding matrix in the second codebook may be a precoding matrix in a codebook used when signaling eMIMO-type is configured as 'Class B' in the 3GPP TS 36.211 V13.0.0, or may be a beam weighting matrix, for example, $$W=[w_1 w_2 \ldots w_L].$$

$w_i$, i=1, . . . , L is a column vector of C×1 and represents a weighting factor, C is a quantity of antenna ports, and L is an integer greater than or equal to 1 and represents a quantity of layers for transmitting data. The user equipment may select a precoding matrix from the second codebook based on a quantity of antenna ports of a CSI-RS resource such as $C_1$ or $C_2$ in this embodiment and based on the quantity of layers for transmitting data.

The network device determines, for the user equipment, a codebook used for each CSI-RS resource, and notifies the user equipment of the codebook by using indication information. Optionally, the network device may also indicate the used codebook in signaling (for example, RRC signaling) for configuring the CSI-RS resource. Each codebook is used to report only one PMI, to indicate one precoding matrix in the codebook.

In a specific example, for a non-precoded CSI-RS resource, only the first codebook or both the first codebook and the second codebook may be used for PMI reporting. For a beamformed CSI-RS resource, only the second codebook or both the first codebook and the second codebook may be used for PMI reporting.

In this embodiment, the CSI-RS resource 1 is a non-precoded CSI-RS resource, and the CSI-RS resource 2 is a beamformed CSI-RS resource. The network device determines that, for the CSI-RS resource 1, the first codebook is used to report the first PMI. For the CSI-RS resource 2, the first codebook and the second codebook are used to report the first PMI and a second PMI. After performing channel estimation based on the CSI-RS resource 1, the user equipment may determine, based on a signal to interference plus noise ratio maximizing criterion, a specific to-be-used precoding matrix in the first codebook, and determine a value of the first PMI that needs to be reported. After performing channel estimation based on the CSI-RS resource 2, the user equipment may determine, based on the signal to interference plus noise ratio maximizing criterion, a specific to-be-used precoding matrix in the first codebook and a specific to-be-used precoding matrix in the second codebook, and determine a value of the first PMI that needs to be reported and a value of the second PMI that needs to be reported.

After determining the PMIs that need to be reported for the CSI-RS resource 1 and the CSI-RS resource 2, the user equipment reports the determined PMIs.

Figure 5:
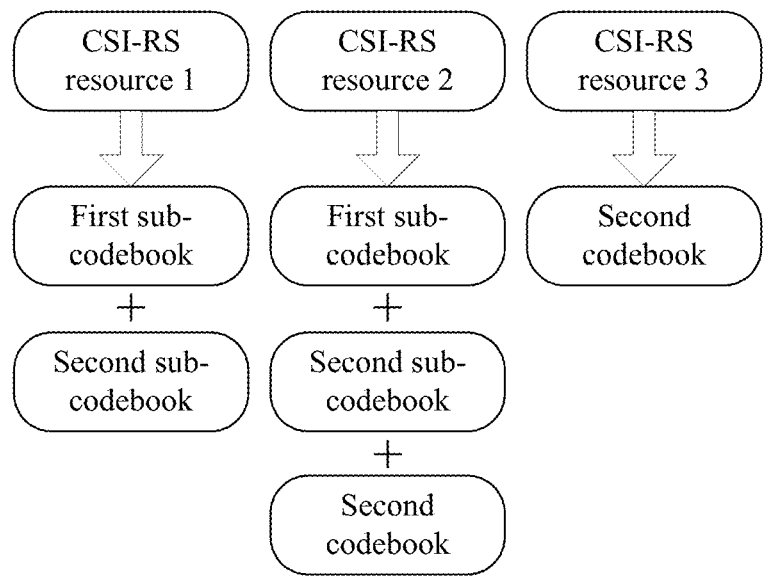
FIG. 5 is a schematic diagram of another correspondence between a reference signal resource and a codebook according to an embodiment of this application.

With reference to the precoding matrix indication method corresponding to FIG. 2 or FIG. 3, FIG. 5 is a schematic diagram of another correspondence between a reference signal resource and a codebook according to an embodiment of this application.

In the embodiment corresponding to FIG. 5, for example, a system includes a first sub-codebook, a second sub-codebook, and a second codebook, namely, N=3 is used as an example for description.

A network device may pre-configure an antenna port set of a CSI-RS resource for user equipment. The antenna port set includes M (M≥1) antenna ports, $C_1$ ($C_1$≥1) antenna ports are selected from the port set to form a CSI-RS resource 1, $C_2$ ($C_2$≥1) antenna ports are selected to form a CSI-RS resource 2, and $C_3$ ($C_3$≥1) antenna ports are selected to form a CSI-RS resource 3.

In this embodiment, beam selection is implemented by using two codebooks: the first sub-codebook and the second sub-codebook in a combined manner. The first sub-codebook is used for beam basis vector selection. A precoding matrix in the first sub-codebook is a weighting matrix for forming X (1≤X) beams by C (C≥1) antenna ports. The X beams are at least one group of orthogonal or non-orthogonal bases in a beam space. Optionally, a specific form of the first sub-codebook may be the same as that of the first codebook in the foregoing embodiments, and details are not described herein again. In addition, the first sub-codebook may alternatively be an orthogonal DFT matrix. The method used by the user equipment for the first sub-codebook is the same as that used for the first codebook in the foregoing embodiments, and a difference lies only in that X beams are selected by using the first sub-codebook.

The second sub-codebook is used for beam selection. A precoding matrix in the second sub-codebook is a selection matrix for selecting K (1≤K≤C) beams from X beams. Optionally, the precoding matrix in the second sub-codebook may be designed as an X×K matrix including K non-zero elements, so as to select the K beams from the X beams. The user equipment may select the precoding matrix from the second sub-codebook based on values of X and K and a beam that needs to be used by the user equipment.

The second codebook is used for beam combination, and a form and a using manner of a precoding matrix in the second codebook are the same as those of the second codebook in the foregoing embodiment.

The network device determines, for the user equipment, a codebook used for each CSI-RS resource, and notifies the user equipment of the codebook by using indication information. For a specific implementation, refer to the description of the embodiment in FIG. 4.

In a specific example, for a non-precoded CSI-RS resource, the first sub-codebook and the second sub-codebook or all of the first sub-codebook, the second sub-codebook, and the second codebook may be used for PMI reporting. For a beamformed CSI-RS resource, only the second codebook or all of the first sub-codebook, the second sub-codebook, and the second codebook may be used for PMI reporting.

In this embodiment, the CSI-RS resource 1 is a non-precoded CSI-RS resource, and the CSI-RS resource 2 and the CSI-RS resource 3 are beamformed CSI-RS resources. The network device determines that, for the CSI-RS resource 1, the first sub-codebook and the second sub-codebook are used to report a first sub-PMI and a second sub-PMI. For the CSI-RS resource 2, the first sub-codebook, the second sub-codebook, and the second codebook are used to report the first sub-PMI, the second sub-PMI, and the second PMI. For the CSI-RS resource 3, the second codebook is used to report the second PMI. The user equipment performs channel estimation by using different CSI-RS resources, and determines, based on the indication information, a to-be-used precoding matrix from a corresponding codebook. For a specific implementation method, refer to the embodiment corresponding to FIG. 4. In this embodiment, when using the first sub-codebook and the second sub-codebook, the user equipment may also determine, based on a signal to interference plus noise ratio maximizing criterion, a specific precoding matrix that needs to be used.

The user equipment determines the first sub-PMI and the second sub-PMI that are corresponding to the CSI-RS resource 1, the first sub-PMI, the second sub-PMI, and the second PMI that are corresponding to the CSI-RS resource 2, and the second PMI corresponding to the CSI-RS resource 3, and reports the PMIs to the network device.

Figure 6:
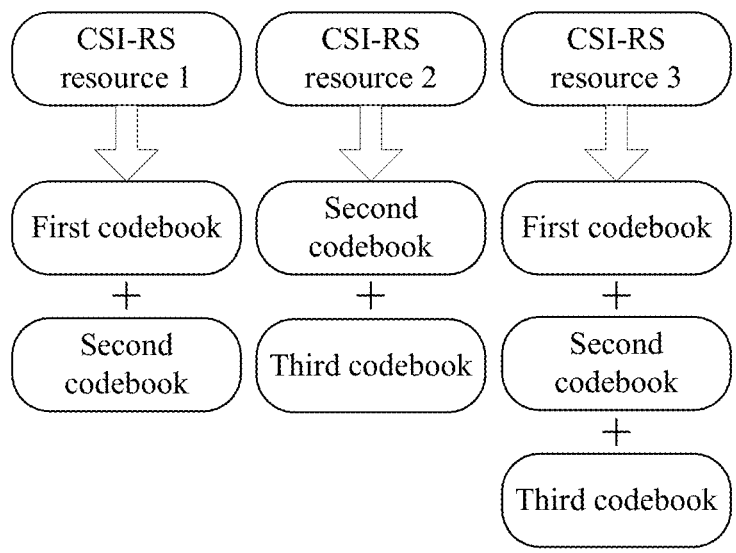
FIG. 6 is a schematic diagram of still another correspondence between a reference signal resource and a codebook according to an embodiment of this application.

With reference to the precoding matrix indication method corresponding to FIG. 2 or FIG. 3, FIG. 6 is a schematic diagram of still another correspondence between a reference signal resource and a codebook according to an embodiment of this application.

In the embodiment corresponding to FIG. 6, for example, a system includes a first codebook, a second codebook, and a third codebook, namely, N=3 is used as an example for description.

A process of determining a codebook and a PMI that are corresponding to a CSI-RS resource 1 is the same as that of determining the codebooks and the PMIs that are corresponding to the CSI-RS resource 2 in FIG. 4.

In this embodiment, a process of determining the second codebook and a second PMI that are correspondingly used for a CSI-RS resource 2 is the same as that of determining the second codebook and the second PMI that are correspondingly used for the CSI-RS resource 2 in FIG. 5. In addition, the CSI-RS resource 2 further includes beams that are in different polarization directions; therefore, the third codebook may be further used to feed back a third PMI, so as to compensate an amplitude difference and/or a phase difference between beams that are in different polarization directions.

Antenna ports used for a CSI-RS resource 3 are distributed on different antenna panels, namely, beams corresponding to the CSI-RS resource 3 come from different antenna panels. For this type of CSI-RS resource, the third codebook may be used to feed back the third PMI, so as to compensate an amplitude difference and/or a phase difference between beams of different antenna panels.

For functions and design manners of the first codebook and the second codebook, refer to the embodiment corresponding to FIG. 4.

The third codebook is used for inter-beam amplitude and/or phase compensation. A precoding matrix in the third codebook is a matrix for amplitude and/or phase compensation between different beams. The amplitude and/or phase compensation between different beams includes at least one of amplitude compensation between beams that are in different polarization directions, phase compensation between beams that are in different polarization directions, amplitude compensation between beams from different antenna panels, or phase compensation between beams from different antenna panels. Optionally, the precoding matrix in the third codebook may be designed in a same form as the second codebook in the foregoing embodiment. A difference lies in that an element in the precoding matrix in the third codebook is used for inter-beam amplitude and/or phase compensation, and that each element may be an amplitude factor and/or a phase factor. Optionally, the element in the precoding matrix in the third codebook may also have a linear incremental phase characteristic, for example, in $W=[w_1 \ w_2 \ \ldots \ w_L]$, the following equation is satisfied:

$$\frac{w_2}{w_1} = \ldots \frac{w_L}{w_{L-1}},$$

where meanings of the variables are the same as those in the embodiment in FIG. 4.

Optionally, the third codebook may alternatively be divided into at least two sub-codebooks for implementation. For example, the third codebook may include a third sub-codebook and a fourth sub-codebook. The third sub-codebook is used for amplitude and/or phase compensation between beams that are in different polarization directions, and the fourth sub-codebook is used for amplitude and/or phase compensation between beams from different panels. A design manner similar to that of the precoding matrix in the third codebook may be used for a precoding matrix in the third sub-codebook and/or the fourth sub-codebook. The third sub-codebook and the fourth sub-codebook are respectively corresponding to a third sub-PMI and a fourth sub-PMI. For a specific indication manner, refer to the descriptions about the foregoing other codebooks.

In this embodiment, a network device determines that, for the CSI-RS resource 1, the first codebook and the second codebook need to be used to report a first PMI and a second PMI; for the CSI-RS resource 2, the second codebook and the third codebook need to be used to report the second PMI and a third PMI; and for the CSI-RS resource 3, the first codebook, the second codebook, and the third codebook need to be used to report the first PMI, the second PMI, and the third PMI. Usage, designs, and using manners of the first codebook and the second codebook are the same as those in the embodiment in FIG. 4. The user equipment may determine, based on a signal to interference plus noise ratio maximizing criterion, a specific precoding matrix to be used for the CSI-RS resource 2 in the third codebook, a value of the third PMI corresponding to the CSI-RS resource 2, a specific precoding matrix to be used for the CSI-RS resource 3 in the third codebook, and a value of the third PMI corresponding to the CSI-RS resource 3. Then, the PMI corresponding to the CSI-RS resource 1, the PMI corresponding to the CSI-RS resource 2, and the PMI corresponding to the CSI-RS resource 3 are reported.

For other processes of determining the CSI-RS resources and determining and reporting the PMIs in this embodiment, refer to the embodiment corresponding to FIG. 4 or FIG. 5. Details are not described herein again.

Optionally, any one or more of the first codebook to the $N^{th}$ codebook in the foregoing embodiments may be further divided into more sub-codebooks for implementation. Correspondingly, each sub-codebook is corresponding to one sub-PMI, each PMI is corresponding to one precoding matrix index in the sub-codebook. For example, the first codebook used for beam selection in the foregoing embodiments may be divided into the first sub-codebook and the second sub-codebook for implementation. For another example, the third codebook in the foregoing embodiments may also be divided into the third sub-codebook and the fourth sub-codebook for implementation.

Optionally, any two or more of the first codebook to the $N^{th}$ codebook in the foregoing embodiments may also be designed in a combined manner, so that one codebook is corresponding to one PMI. For example, in the embodiment corresponding to FIG. 6, the second codebook and the third codebook may be designed in a combined manner, so that one codebook is used to implement beam combination and inter-beam difference compensation; or the second codebook and the third sub-codebook may be designed in a combined manner, so that one codebook is used to implement beam combination and difference compensation between beams that are in different polarization directions. Similarly, the second codebook and the fourth sub-codebook may also be designed in a combined manner, so that one codebook is used to implement beam combination and difference compensation between beams from different panels.

Optionally, the solutions provided in this application may also be used in combination with a codebook and a PMI reporting manner in the prior art. For example, based on a PMI reporting policy of an existing LTE system, the third codebook (the third sub-codebook and/or the fourth sub-codebook) in the foregoing embodiments is added, and when inter-beam amplitude and/or phase compensation needs to be performed, the user equipment is instructed, by using the indication information, to report a corresponding PMI by using the third codebook. In this way, while using an existing PMI reporting policy, the system can instruct the user equipment to additionally use which codebook to perform PMI reporting in more scenarios, so as to adapt to a current scenario.

Figure 9:
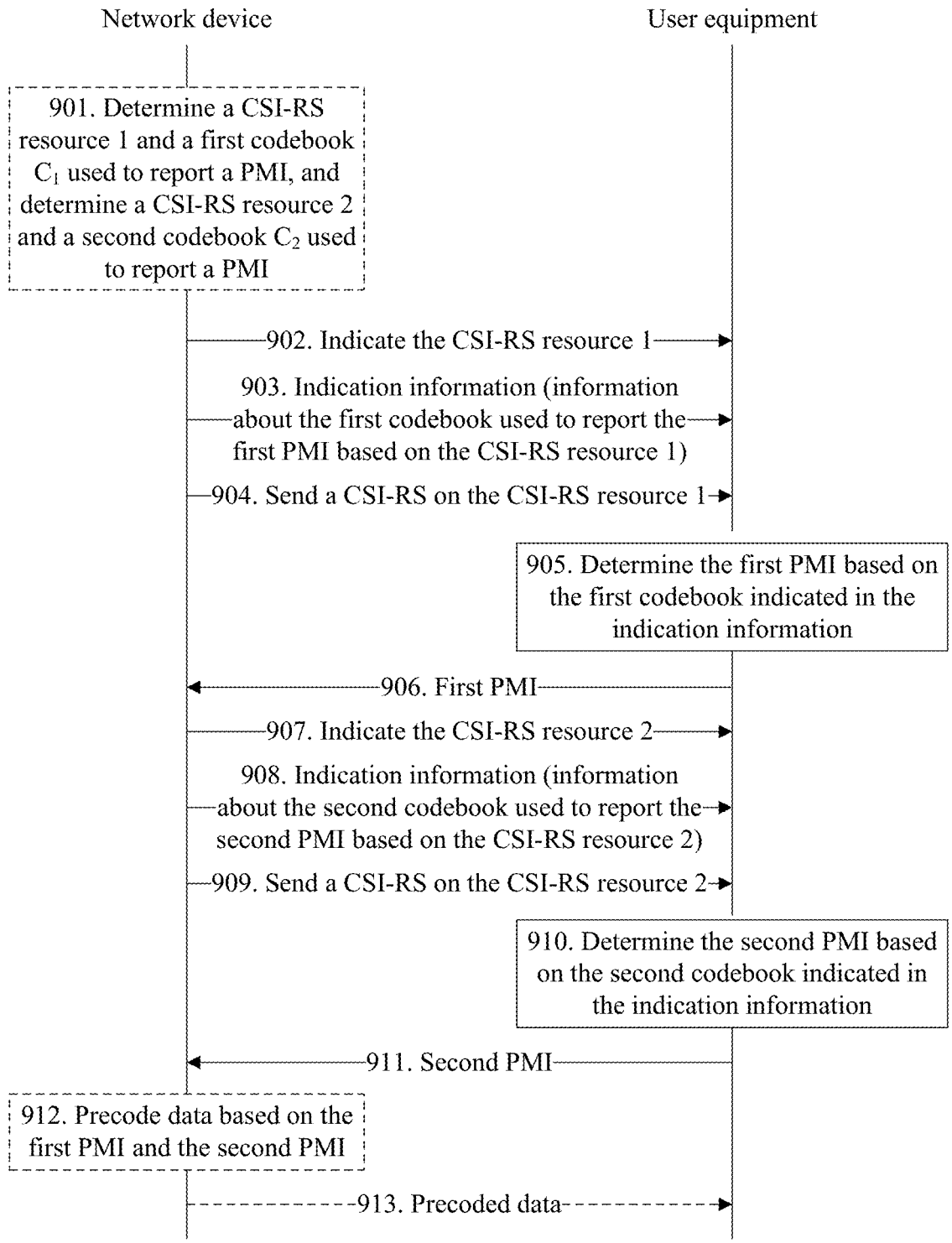
FIG. 9 is a schematic flowchart of another precoding matrix indication method according to an embodiment of this application.

FIG. 9 is a schematic flowchart of another precoding matrix indication method according to an embodiment of this application. A network device may configure at least two CSI-RS resources for user equipment, and send indication information to indicate, to the user equipment, information about codebooks used when PMIs are reported by using different CSI-RS resources. The user equipment determines, based on the indication information of the network device, the PMIs by using different CSI-RS resources and the corresponding codebooks, and reports the PMIs to the network device. The network device precodes data based on the PMIs reported by the user equipment. In the embodiment corresponding to FIG. 9, an example in which the network device configures two CSI-RS resources for the user equipment is used for description. In addition, it is assumed that the network device includes N (N≥1) antenna panels, each antenna panel includes M (M≥1) CSI-RS antenna ports, the M CSI-RS antenna ports may include a cross polarization antenna port and/or a single polarization antenna port, the CSI-RS antenna ports are antenna ports that can be used to send CSI-RSs, and each antenna port may be implemented by using one physical antenna unit or an antenna array that includes at least two physical antenna units.

Optionally, in part 901, the network device determines a CSI-RS resource 1 and a first codebook $C_1$ used to report a first PMI by using the CSI-RS resource 1, and determines a CSI-RS resource 2 and a second codebook $C_2$ used to report a second PMI by using the CSI-RS resource 2. For a specific manner of determining a CSI-RS resource by the network device, refer to the description of part 301.

In a specific example, the CSI-RS resource 1 may be a non-precoded CSI-RS resource, and the CSI-RS resource 1 may include M' (M'≤M) CSI-RS antenna ports that come from one antenna panel. In this case, the first codebook $C_1$ used to report the first PMI by using the CSI-RS resource 1 may be a codebook used to implement at least one of functions of beam selection, beam combination, inter-beam amplitude compensation, or inter-beam phase compensation. Optionally, a precoding matrix W in the first codebook $C_1$ satisfies $W=W_1W_2$. Optionally, $W_1$ may be an oversampled discrete Fourier transform (DFT) matrix, for example, a precoding matrix used to determine a PMI when signaling eMIMO-type is configured as 'Class A' in the 3rd Generation Partnership Project (3GPP) TS 36.213 V13.0.0. Optionally, $W_2$ may be a precoding matrix used to determine a PMI when signaling eMIMO-type is configured as 'Class B' in the TS 36.213 V13.0.0.

In another specific example, the CSI-RS resource 1 may be a precoded CSI-RS resource, and the CSI-RS resource 1 may include M' (M'≤M) CSI-RS antenna ports that come from one antenna panel. In this case, the first codebook $C_1$ used to report the first PMI by using the CSI-RS resource 1 may be a codebook used to implement at least one of functions of beam combination, inter-beam amplitude compensation, or inter-beam phase compensation. Optionally, a precoding matrix W in the first codebook $C_1$ satisfies $W=W_B$. For example, $W_B$ may be a precoding matrix used to determine a PMI when signaling eMIMO-type is configured as 'Class B' in the TS 36.213 V13.0.0.

In still another example, the CSI-RS resource 1 may include N' (N'≤N) CSI-RS resources, the N' CSI-RS resources include a non-precoded CSI-RS resource and/or a precoded CSI-RS resource, and the N' CSI-RS resources include CSI-RS antenna ports from N' antenna panels. To be specific, one of the N' CSI-RS resources includes M' (M'≤M) CSI-RS antenna ports that come from one antenna panel, and CSI-RS antenna ports of different CSI-RS resources come from different antenna panels. In this case, the user equipment separately determines N' first PMIs in the first codebook $C_1$ by using the N' CSI-RS resources of the CSI-RS resource 1. Different CSI-RS resources may be corresponding to different first codebooks. For selection and characteristics of first codebooks $C_1$ corresponding to different types of CSI-RS resources of the CSI-RS resource 1, refer to the descriptions in the foregoing two specific examples.

With reference to any one of the three specific examples in part 901, in a specific example, the CSI-RS resource 2 may be a precoded CSI-RS resource. The CSI-RS resource 2 includes N' (N'≤N) CSI-RS antenna ports. Different CSI-RS antenna ports come from different antenna panels, and antenna units or antenna ports on a same antenna panel may form one beam and are corresponding to one CSI-RS antenna port in the CSI-RS resource 2. Optionally, the network device precodes, based on the first PMI fed back by the user equipment, the CSI-RS antenna ports that are on N' antenna panels, to obtain a CSI-RS to be sent on the CSI-RS resource 2. In this case, the second codebook $C_2$ used to feed back the second PMI by using the CSI-RS resource 2 may be a codebook used to implement at least one of functions of inter-beam phase compensation, inter-beam amplitude compensation, phase compensation between beams that come from different antenna panels, or amplitude compensation between beams that come from different antenna panels. A precoding matrix W' in the second codebook $C_2$ may satisfy the following form:

$$W' = \begin{bmatrix} c_1 \\ c_2 \\ \vdots \\ c_{N'} \end{bmatrix} \text{ or } W' = \begin{bmatrix} c_1 & 0 & \cdots & 0 \\ 0 & c_2 & \cdots & 0 \\ \vdots & \vdots & \ddots & \vdots \\ 0 & 0 & \cdots & c_{N'} \end{bmatrix}.$$

$c_1, \ldots, c_{N'}$ may satisfy one of the following forms:

$$\begin{bmatrix} c_1 \\ c_2 \\ \vdots \\ c_{N'} \end{bmatrix} = \begin{bmatrix} 1 \\ e^{j\theta_1} \\ \vdots \\ e^{j\theta_{N'-1}} \end{bmatrix} \text{ or } \begin{bmatrix} c_1 \\ c_2 \\ \vdots \\ c_{N'} \end{bmatrix} = \begin{bmatrix} a_1 \\ a_2 \\ \vdots \\ a_{N'} \end{bmatrix} \text{ or }$$

$$\begin{bmatrix} c_1 \\ c_2 \\ \vdots \\ c_{N'} \end{bmatrix} = \begin{bmatrix} a_1 \\ a_2 e^{j\theta_1} \\ \vdots \\ a_{N'} e^{j\theta_{N'-1}} \end{bmatrix}.$$

$a_1, \ldots, a_{N'}$ are amplitude factors, and values of $a_1, \ldots, a_{N'}$ may be selected depending on different quantization rules. For example, the values of $a_1, \ldots, a_{N'}$ may be values in a set $\{0, 1\}$, there is only one 1 in $a_1, \ldots, a_{N'}$, and the rest elements are 0. For another example, x-bit (x≥1) quantization may be performed between [0, 1] on the values of $a_1, \ldots, a_{N'}$. For example, when x=2, the values of $a_1, \ldots, a_{N'}$ may be values in a set $\{0.25, 0.5, 0.75, 1\}$. $\theta_1, \ldots, \theta_{N'-1}$ are phase factors, and values of $\theta_1, \ldots, \theta_{N'-1}$ may be selected between [0, 2π] depending on different quantization rules. For example, 2-bit quantization may be performed between [0, 2π]. In other words, the values of $\theta_1, \ldots, \theta_{N'-1}$ may be elements in a set $\{1, -1, +j, -j\}$. For another example, 3-bit quantization may be performed between [0, 2π], and the values of $\theta_1, \ldots, \theta_{N'-1}$ may be $$\theta_i = e^{j\frac{2\pi k}{8}},$$

k=0, 1, . . . , 7, i=1, . . . , N'−1, where j is an imaginary unit.

With reference to any one of the three specific examples, about the CSI-RS resource 1, in part 901, in another specific example, the CSI-RS resource 2 may be a precoded CSI-RS resource. The CSI-RS resource 2 includes 2N' (N'≤N) CSI-RS antenna ports. Every two CSI-RS antenna ports come from a same antenna panel, but the two CSI-RS antenna ports and other antenna ports come from different antenna panels. Antenna units or antenna ports in a same polarization direction on a same antenna panel may form one beam and are corresponding to one CSI-RS antenna port in the CSI-RS resource 2. Antenna units or antenna ports in two polarization directions on each antenna panel may form two beams and are corresponding to two CSI-RS antenna ports that come from a same antenna panel in the CSI-RS resource 2. Optionally, the network device precodes, based on the first PMI fed back by the user equipment, the CSI-RS antenna ports that are on N' antenna panels, to obtain a CSI-RS to be sent on the CSI-RS resource 2. In this case, the second codebook $C_2$ used to feed back the second PMI by using the CSI-RS resource 2 may be a codebook used to implement at least one of functions of inter-beam phase compensation, inter-beam amplitude compensation, phase compensation between beams that come from different antenna panels, or amplitude compensation between beams that come from different antenna panels. A precoding matrix W' in the second codebook $C_2$ may satisfy the following form:

$$W' = \begin{bmatrix} c_{1,1} \\ c_{1,2} \\ \vdots \\ c_{N',1} \\ c_{N',2} \end{bmatrix} \text{ or}$$

$$W' = \begin{bmatrix} c_{1,1} & 0 & \cdots & 0 & 0 \\ 0 & c_{1,2} & \cdots & 0 & 0 \\ \vdots & \vdots & \ddots & \vdots & \vdots \\ 0 & 0 & \cdots & c_{N',1} & 0 \\ 0 & 0 & \cdots & 0 & c_{N',2} \end{bmatrix}.$$

$c_{i,1}$, i=1, . . . N' represents a compensation coefficient corresponding to a CSI-RS antenna port including an antenna unit or antenna port in a first polarization direction on an $i^{th}$ antenna panel, and a form of $c_{i,1}$, i=1, . . . N' may be the same as that of $c_1, \ldots c_{N'}$. $c_{i,2}$, i=1, . . . N' represents a compensation coefficient corresponding to a CSI-RS antenna port including an antenna unit or antenna port in a second polarization direction on the $i^{th}$ antenna panel, and a form of $c_{i,2}$, i=1, . . . N' may be the same as that of $c_1, \ldots, c_{N'}$. Details are not described herein again. The first polarization direction and the second polarization direction may be a same polarization direction or may be different polarization directions.

With reference to any one of the three specific examples, about the CSI-RS resource 1, in part 901, in still another specific example, the CSI-RS resource 2 may be a precoded CSI-RS resource. The CSI-RS resource 2 includes the two types of CSI-RS antenna ports that are in the foregoing two specific examples about the CSI-RS resource 2. To be specific, the CSI-RS resource 2 includes one CSI-RS antenna port, the CSI-RS antenna port includes M' (M'≤M) CSI-RS antenna ports or antenna units that are on one antenna panel, and the CSI-RS antenna port and another CSI-RS antenna port in the CSI-RS resource 2 come from different antenna panels. In addition, the CSI-RS resource 2 further includes other two CSI-RS antenna ports. The two CSI-RS antenna ports come from another antenna panel, but the two CSI-RS antenna ports and another CSI-RS antenna port in the CSI-RS resource 2 come from different antenna panels. Antenna units or antenna ports in a same polarization direction on the another antenna panel may form one beam and form one of the two CSI-RS antenna ports. In this case, a precoding matrix W' in the second codebook $C_2$ may be a mixed form of W's in the foregoing two examples. To be specific, some elements of W' in this example satisfy the form of the elements of W' in one of the foregoing examples, and the other elements of W' in this example satisfy the form of the elements of W' in the other example.

Optionally, in the codebook $C_2$, different precoding matrixes may be corresponding to different codebook indexes. The codebook index represents a sequence number of the precoding matrix in the codebook, and a value of the codebook index equals a value of the second PMI.

Optionally, for specific design manners of the first codebook $C_1$ and/or the second codebook $C_2$, still refer to the design manners of any one or more codebooks in the embodiments corresponding to FIG. 4 to FIG. 6, and details are not described herein again.

Part 902. The network device indicates configuration information of the CSI-RS resources to the user equipment. Optionally, for a specific implementation of this part, refer to the description of part 302. In a specific example, the network device indicates configuration information of the CSI-RS resource 1 to the user equipment. For a specific feature of the CSI-RS resource 1, refer to the description about the specific examples of the CSI-RS resource 1 in part 901.

Part 903. The user equipment receives indication information sent by the network device, where the indication information includes information about the codebooks used by the user equipment to report the PMIs. Optionally, for a specific implementation of this part, refer to the description of part 201. In a specific example, the indication information includes information about the first codebook used to report the first PMI based on the CSI-RS resource 1. For specific design manners of the CSI-RS resource 1 and the first codebook, refer to the descriptions about the specific examples of the CSI-RS resource 1 and the first codebook in part 901.

Part 904. The network device sends a CSI-RS. In a specific example, the network device sends the CSI-RS on the CSI-RS resource 1, and the user equipment may perform channel estimation and measurement based on the received CSI-RS.

Part 905. The user equipment determines the first PMI from the first codebook based on the indication information of part 903 by using the CSI-RS received on the CSI-RS resource 1. In a specific example, the user equipment may perform channel estimation based on the CSI-RS received on the CSI-RS resource 1, determine, based on a signal to interference plus noise ratio maximizing criterion, a specific to-be-used precoding matrix in the first codebook, and determine, based on the selected precoding matrix, a value of the first PMI that needs to be reported. For example, the value of the first PMI may be an index number of the selected precoding matrix.

Part 906. The user equipment reports the PMI. Optionally, for a specific implementation of this part, refer to the description of part 202. In a specific example, the user equipment reports the first PMI determined in part 905 to the network device.

Parts 907 to 911. The network device indicates a configuration of the CSI-RS resource 2 to the user equipment, and sends the indication information to the user equipment, so as to indicate, to the user equipment, the second codebook used to report the second PMI by using the CSI-RS resource 2, and send a CSI-RS on the CSI-RS resource 2. The user equipment determines the second PMI based on an indication in the indication information by using the CSI-RS received on the CSI-RS resource 2 and the precoding matrix in the second codebook, and reports the second PMI to the network device. Specific implementation of these parts is similar to the descriptions of parts 902 to 906. A difference lies only in that the CSI-RS resource 2, the second codebook, and the second PMI are related in parts 907 to 911. For specific implementations of the CSI-RS resource 2 and the second codebook, refer to the descriptions about the specific examples of the CSI-RS resource 2 and the second codebook in part 901.

Optionally, in part 912, the network device precodes downlink data based on the first PMI and the second PMI that are reported by the user equipment.

Optionally, in part 913, the network device sends precoded downlink data to the user equipment.

Optionally, this application does not impose any limitation on a sequence of the parts in the embodiment corresponding to FIG. 9, and two or more of the parts may alternatively be combined into one part for implementation. For example, part 907 may be performed before part 903, or part 907 and part 902 may alternatively be combined into one piece of signaling for implementation. To be specific, the network device may indicate configurations of the CSI-RS resource 1 and the CSI-RS resource 2 to the user equipment in one piece of signaling, or may separately indicate configurations of the CSI-RS resource 1 and the CSI-RS resource 2 to the user equipment in different pieces of signaling. For another example, part 903 and part 902 may be combined for implementation. To be specific, the network device may indicate, to the user equipment in one piece of signaling, the configuration of the CSI-RS resource 1 and the information about the first codebook used to report the first PMI based on the CSI-RS resource 1. For still another example, parts 902, 903, 907, and 908 may alternatively be combined into one part for implementation.

Optionally, when the network device configures at least two CSI-RS resources for the user equipment, configuration parameters of the at least two CSI-RS resources may be mutually independent. However, to help the user equipment to use the at least two CSI-RS resources to perform measurement and PMI reporting, a specified relationship may also be configured between the configuration parameters of the at least two CSI-RS resources. In a specific example, there may be a specified relationship between measurement periods of the at least two CSI-RS resources. With reference to the embodiment corresponding to FIG. 9, using the CSI-RS resource 1 and the CSI-RS resource 2 as an example, a measurement period of the CSI-RS resource 1 is $T_1$ and a measurement period of the CSI-RS resource 2 is $T_2$, where $T_2=XT_1$ (X≥1), and $T_1$ and $T_2$ may be represented as quantities of subframes included within one measurement period or may be represented as specific time lengths. The second codebook is a codebook used to implement at least one of functions of inter-beam phase compensation, inter-beam amplitude compensation, phase compensation between beams that come from different antenna panels, or amplitude compensation between beams that come from different antenna panels. Variation of an amount of the compensation is relatively slow; therefore, the measurement period of the CSI-RS resource 2 may be greater than the measurement period of the CSI-RS resource 1. In a specific example, there may also be a specified relationship between subframe offsets of the at least two CSI-RS resources. With reference to the embodiment corresponding to FIG. 9, using the CSI-RS resource 1 and the CSI-RS resource 2 as an example, if at least one of the CSI-RS resource 1 or the CSI-RS resource 2 is non-periodic, a specified sequence may be set between an index of a subframe in which the CSI-RS resource 1 resides and an index of a subframe in which the CSI-RS resource 2 resides, so that a measurement sequence of different CSI-RS resources is implemented.

When the network device configures at least two CSI-RS resources for the user equipment, optionally, the network device may notify, by using signaling (for example, RRC signaling or CSI measurement configuration signaling), the user equipment of specific usages of different CSI-RS resources or a relationship between the CSI-RS resources and CSI reporting. For example, the network device may notify the user equipment that the CSI-RS resource 1 is used to feed back a PMI and CSI-RS resource 2 is used to feed back a PMI and a channel quality indicator (CQI). Optionally, the network device and the user equipment may further agree on specific usages of the CSI-RS resources and a relationship between the CSI-RS resources and CSI reporting in advance. For example, it is agreed on in advance that a first CSI-RS resource is used to feed back a PMI and a second CSI-RS resource is used to feed back a PMI and a CQI. The network device notifies, by using signaling, the user equipment which CSI-RS resource is the first CSI-RS resource and which CSI-RS resource is the second CSI-RS resource, and the user equipment reports a PMI and/or a CQI by using different CSI-RS resources based on the specific usages of the CSI-RS resources or the relationship between the CSI-RS resources and CSI reporting that is agreed on in advance. In a specific example, with reference to the embodiment corresponding to FIG. 9, the user equipment may perform channel quality measurement based on the CSI-RS resource 2 and report a CQI. Optionally, after receiving the first PMI reported by the user equipment, the network device may determine the used precoding matrix W in the first codebook. The network device may precode CSI-RS antenna ports on each panel by using the precoding matrix W, to obtain the CSI-RS resource 2, and then the user equipment performs channel measurement based on the CSI-RS received on the CSI-RS resource 2 and reports a CQI.

When the network device configures at least two CSI-RS resources for the user equipment, optionally, a precoding matrix assumption for the user equipment to obtain a CQI may alternatively be agreed on in advance. To be specific, a relationship between a precoding matrix $W_{CQI}$ used when the user equipment obtains a CQI and a PMI determined by using the at least two CSI-RS resources is agreed on in advance. In a specific example, with reference to the embodiment corresponding to FIG. 9, it may be assumed that $W_{CQI}$ satisfies at least one of the following forms:

(1) When the precoding matrix W in the first codebook $C_1$ satisfies $W=W_1W_2$ and the precoding matrix W' in the second codebook $C_2$ satisfies:

$$W' = \begin{bmatrix} c_1 \\ c_2 \\ \vdots \\ c_{N'} \end{bmatrix},$$

$W_{CQI}$ may satisfy:

$$W_{CQI} = \begin{bmatrix} W_1W_2 & 0 & \cdots & 0 \\ 0 & W_1W_2 & \cdots & \vdots \\ \vdots & \vdots & \ddots & 0 \\ 0 & 0 & \cdots & W_1W_2 \end{bmatrix} \cdot W' \begin{pmatrix} c_1 W_1 W_2 \\ c_2 W_1 W_2 \\ \vdots \\ c_{N'} W_1 W_2 \end{pmatrix}.$$

(2) When the precoding matrix W in the first codebook $C_1$ satisfies $W=W_1W_2$ and the precoding matrix W' in the second codebook $C_2$ satisfies:

$$W' = \begin{bmatrix} c_1 & 0 & \cdots & 0 \\ 0 & c_2 & \cdots & 0 \\ \vdots & \vdots & \ddots & \vdots \\ 0 & 0 & \cdots & c_{N'} \end{bmatrix},$$

$W_{CQI}$ may satisfy:

$$W_{CQI} = (W' \otimes I_{2K_1K_2}) \cdot \begin{pmatrix} W_1W_2 \\ W_1W_2 \\ \vdots \\ W_1W_2 \end{pmatrix} = \begin{pmatrix} c_1 W_1 W_2 \\ c_2 W_1 W_2 \\ \vdots \\ c_{N'} W_1 W_2 \end{pmatrix},$$

where $\otimes$ represents a Kronecker product, $K_1$ represents a quantity of horizontal CSI-RS antenna ports in one polarization direction on one antenna panel, and $K_2$ represents a quantity of vertical CSI-RS antenna ports in one polarization direction on one antenna panel.

(3) When the precoding matrix W in the first codebook $C_1$ satisfies $W=W_B$ and the precoding matrix W' in the second codebook $C_2$ satisfies:

$$W' = \begin{bmatrix} c_1 \\ c_2 \\ \vdots \\ c_{N'} \end{bmatrix},$$

$W_{CQI}$ may satisfy:

$$W_{CQI} = \begin{bmatrix} W_B & 0 & \cdots & 0 \\ 0 & W_B & \cdots & \vdots \\ \vdots & \vdots & \ddots & 0 \\ 0 & 0 & \cdots & W_B \end{bmatrix} \cdot W' \begin{pmatrix} c_1 W_B \\ c_2 W_B \\ \vdots \\ c_{N'} W_B \end{pmatrix}.$$

(4) When the precoding matrix W in the first codebook $C_1$ satisfies $W=W_B$ and the precoding matrix W' in the second codebook $C_2$ satisfies:

$$W' = \begin{bmatrix} c_1 & 0 & \cdots & 0 \\ 0 & c_2 & \cdots & 0 \\ \vdots & \vdots & \ddots & \vdots \\ 0 & 0 & \cdots & c_{N'} \end{bmatrix},$$

$W_{CQI}$ may satisfy:

$$W_{CQI} = (W' \otimes I_{2K_1K_2}) \cdot \begin{pmatrix} W_B \\ W_B \\ \vdots \\ W_B \end{pmatrix} = \begin{pmatrix} c_1 W_B \\ c_2 W_B \\ \vdots \\ c_{N'} W_B \end{pmatrix},$$

where $\otimes$ represents a Kronecker product, $K_1$ represents a quantity of horizontal CSI-RS antenna ports in one polarization direction on one antenna panel, and $K_2$ represents a quantity of vertical CSI-RS antenna ports in one polarization direction on one antenna panel.

(5) When the CSI-RS resource 1 includes N' CSI-RS resources, a precoding matrix determined by using the N' CSI-RS resources is marked as $W^{(i)}$, where i=1, ..., N', and $W^{(i)}$ satisfies $W^{(i)}=W_1^{(i)}W_2^{(i)}$ or $W^{(i)}=W_B^{(i)}$. When the precoding matrix W' in the second codebook $C_2$ satisfies:

$$W' = \begin{bmatrix} c_1 \\ c_2 \\ \vdots \\ c_{N'} \end{bmatrix},$$

$W_{CQI}$ may satisfy:

$$W_{CQI} = \begin{bmatrix} W^{(1)} & 0 & \cdots & 0 \\ 0 & W^{(2)} & \cdots & \vdots \\ \vdots & \vdots & \ddots & 0 \\ 0 & 0 & \cdots & W^{(N')} \end{bmatrix} \cdot W' = \begin{pmatrix} c_1 W^{(1)} \\ c_2 W^{(2)} \\ \vdots \\ c_{N'} W^{(N')} \end{pmatrix}.$$

(6) When the CSI-RS resource 1 includes N' CSI-RS resources, a precoding matrix determined by using the N' CSI-RS resources is marked as $W^{(i)}$, where i=1, ..., N', and $W^{(i)}$ satisfies $W^{(i)}=W_1^{(i)}W_2^{(i)}$ or $W^{(i)}=W_B^{(i)}$. When the precoding matrix W' in the second codebook $C_2$ satisfies:

$$W' = \begin{bmatrix} c_1 & 0 & \cdots & 0 \\ 0 & c_2 & \cdots & 0 \\ \vdots & \vdots & \ddots & \vdots \\ 0 & 0 & \cdots & c_{N'} \end{bmatrix},$$

$W_{CQI}$ may satisfy:

$$W_{CQI} = (W' \otimes I_{2K_1K_2}) \cdot \begin{pmatrix} W^{(1)} \\ W^{(2)} \\ \vdots \\ W^{(N')} \end{pmatrix} = \begin{pmatrix} c_1 W^{(1)} \\ c_2 W^{(2)} \\ \vdots \\ c_{N'} W^{(N')} \end{pmatrix},$$

where $\otimes$ represents a Kronecker product, $K_1$ represents a quantity of horizontal CSI-RS antenna ports in one polarization direction on one antenna panel, and $K_2$ represents a quantity of vertical CSI-RS antenna ports in one polarization direction on one antenna panel.

Optionally, the singling or indication information in the foregoing embodiments may be implemented by using higher layer signaling such as RRC signaling, or may be implemented by using other signaling such as physical layer signaling. This is not limited in this application.

It should be noted that a number of a codebook such as "first codebook" or "first sub-codebook" in the embodiments of this application does not constitute any limitation on the embodiments of this application. Codebooks with a same number may be corresponding to different functions in different implementations. A codebook and a sub-codebook that have a same number, such as a first codebook and a first sub-codebook, do not necessarily have a subordination relationship or a hierarchical relationship in logic and use. For example, the first sub-codebook may alternatively be defined as a fourth codebook and used independently. This is not limited in this application.

Figure 7:
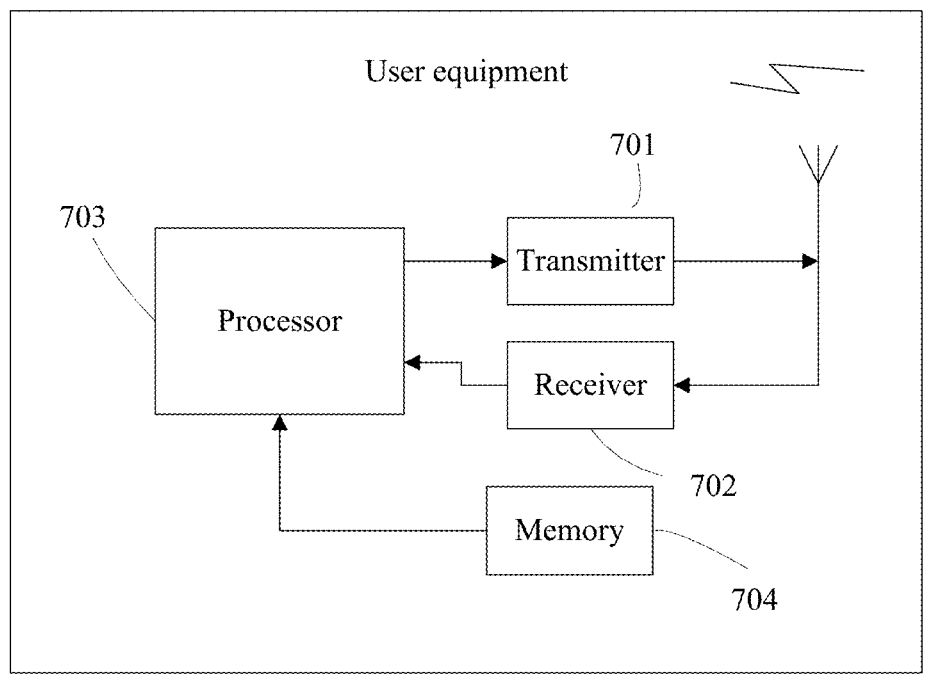
FIG. 7 is a schematic structural diagram of user equipment according to an embodiment of this application.

FIG. 7 is a schematic structural diagram of user equipment according to an embodiment of this application.

In an example, a structure of the user equipment includes a receiver and a transmitter. In an example, the user equipment may further include a processor. In an example, the user equipment may further include a memory. In an example corresponding to FIG. 7, a structure of the user equipment provided in this embodiment of this application includes a transmitter 701, a receiver 702, a processor 703, and a memory 704.

On an uplink, the transmitter 701 modulates to-be-sent data or information (such as a PMI), provides an output sample of the to-be-sent data or information, and generates an uplink signal. The uplink signal is transmitted to the network device in the foregoing embodiments through an antenna. On a downlink, an antenna receives a downlink signal (including the indication information and/or a reference signal) sent by the network device in the foregoing embodiments, and the receiver 702 modulates the signal received from the antenna and provides an input sample. Service data and a signaling message are processed in the processor 703. For example, parsing, channel estimation, and PMI determining are performed on the indication information. These units perform processing according to a radio access technology (for example, an access technology used in an LTE system and other evolved systems) used in a radio access network. The processor 703 is further configured to perform control management on actions of the user equipment, to perform processing performed by the user equipment in the foregoing embodiments, for example, controlling the user equipment to process the indication information, the codebook, and the PMI and/or to perform another process of the technology described in this application. The processor 703 is further configured to support the user equipment in performing the processing processes of the user equipment in FIG. 2 to FIG. 6. The memory 704 is configured to store program code and data of the user equipment.

Figure 8:
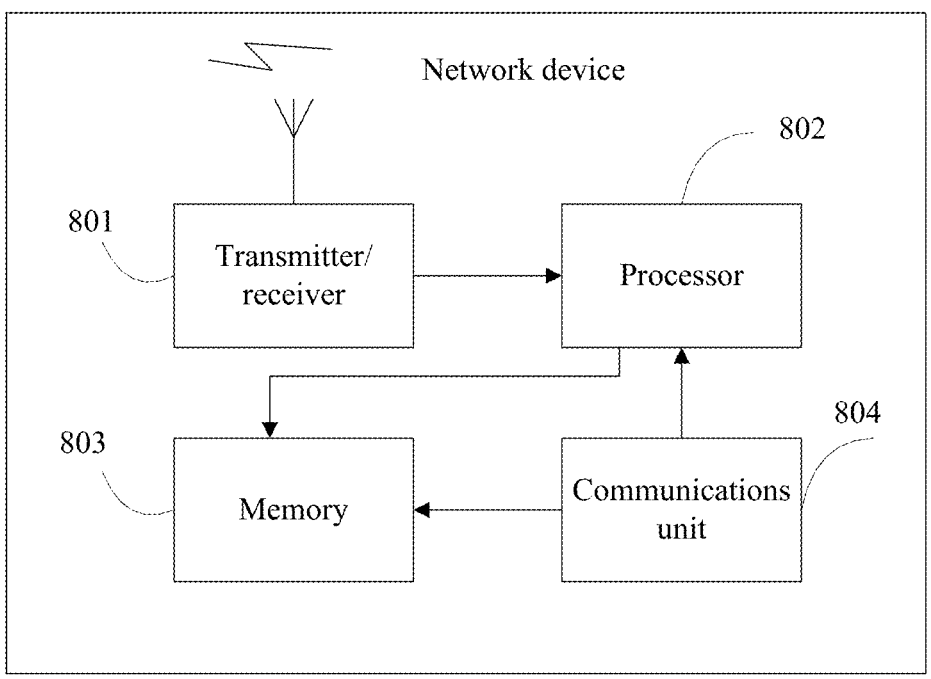
FIG. 8 is a schematic structural diagram of a network device according to an embodiment of this application.

FIG. 8 is a schematic structural diagram of a network device according to an embodiment of this application.

In an example, a structure of the network device includes a transmitter and a receiver. In an example, the network device may further include a processor. In an example, the network device may further include a memory. In an example, the network device may further include a communications unit, configured to support communication with another network device, for example, communication with a core network node. In an example corresponding to FIG. 8, a structure of the network device in this application includes a transmitter/receiver 801, a processor 802, a memory 803, and a communications unit 804.

The transmitter/receiver 801 is configured to support information transmitting and receiving between the network device and the user equipment in the foregoing embodiments, for example, sending the indication information in the foregoing embodiments and receiving the foregoing PMI. The processor 802 performs various functions of performing communication with the user equipment. The processor 802 further performs the processing processes of the network device in FIG. 2 to FIG. 6, for example, determining, for a user, a codebook used to report a PMI. The memory 803 is configured to store program code and data of the network device. The communications unit 804 is configured to support communication between the network device and another network device, for example, communication with a core network node.

It can be understood that FIG. 8 shows merely a simplified design of the network device. In actual application, the network device may include any quantity of transmitters, receivers, processors, memories, and the like. All network devices that can implement this application fall within the protection scope of this application.

The processor configured to execute the user equipment and the network device in this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

Method or algorithm steps described with reference to the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium in any other forms known in the art. For example, a storage medium is coupled to a processor, so that the processor can read information from the storage medium or write information into the storage medium. Certainly, the storage medium may also be a component of the processor. The processor and the storage medium may be located in the ASIC. In addition, the ASIC may be located in the network device and/or the user equipment. Certainly, the processor and the storage medium may alternatively exist in the network device and/or the user equipment as discrete components.

A person skilled in the art should be aware that in the foregoing one or more examples, functions described in this application may be implemented by hardware, software, firmware, or any combination thereof. When the functions described in this application are implemented by software, the functions may be stored in a computer readable medium or transmitted as one or more instructions or code in the computer readable medium. The computer readable medium includes a computer storage medium and a communications medium, where the communications medium includes any medium that enables a computer program to be transmitted from one place to another place. The storage medium may be any available medium that can be accessed by a general-purpose or special-purpose computer.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions in this application shall fall within the protection scope of this application.

What is claimed is:

1. A precoding matrix indication method comprising:
receiving, by user equipment, indication information sent by a network device, wherein the indication information comprises information about codebooks used to report precoding matrix indicators (PMI), the information about the codebooks indicates that the used codebooks are at least two of a first codebook to an $N^{th}$ codebook, the PMIs comprise at least two of a first PMI to an $N^{th}$ PMI, the first PMI to the $N^{th}$ PMI respectively indicate a precoding matrix in the first codebook to a precoding matrix in the $N^{th}$ codebook, and N is an integer greater than or equal to 2; and
sending, by the user equipment, the PMIs based on the indication information,
wherein the first codebook to the $N^{th}$ codebook comprise at least one codebook used for inter-beam amplitude compensation.

2. The method according to claim 1, wherein values of the first PMI to the $N^{th}$ PMI respectively correspond to one codebook index in the first codebook to one codebook index in the $N^{th}$ codebook.

3. The method according to claim 1, wherein the first codebook to the $N^{th}$ codebook comprise at least one codebook used for beam selection.

4. The method according to claim 1, wherein the first codebook to the $N^{th}$ codebook comprise at least one codebook used for beam basis vector selection.

5. The method according to claim 1, wherein the first codebook to the $N^{th}$ codebook comprise at least one codebook used for beam combination.

6. The method according to claim 1, wherein the first codebook to the $N^{th}$ codebook comprise at least one codebook used for phase compensation.

7. User equipment comprising a receiver and a transmitter, both of which are coupled to a processor, wherein:
the receiver is configured to cooperate with the processor to receive indication information sent by a network device, wherein the indication information comprises information about codebooks used to report precoding matrix indicators (PMI), the information about the codebooks indicates that the used codebooks are at least two of a first codebook to an $N^{th}$ codebook, the PMIs comprise at least two of a first PMI to an $N^{th}$ PMI, the first PMI to the $N^{th}$ PMI respectively indicate a precoding matrix in the first codebook to a precoding matrix in the $N^{th}$ codebook, and N is an integer greater than or equal to 2; and the transmitter is configured to cooperate with the processor to send the PMIs based on the indication information, wherein the first codebook to the $N^{th}$ codebook comprise at least one codebook used for inter-beam amplitude compensation.

8. The user equipment according to claim 7, wherein values of the first PMI to the $N^{th}$ PMI respectively correspond to one codebook index in the first codebook to one codebook index in the $N^{th}$ codebook.

9. The user equipment according to claim 7, wherein the first codebook to the $N^{th}$ codebook comprise at least one codebook used for beam selection.

10. The user equipment according to claim 7, wherein the first codebook to the $N^{th}$ codebook comprise at least one codebook used for beam basis vector selection.

11. The user equipment according to claim 7, wherein the first codebook to the $N^{th}$ codebook comprise at least one codebook used for beam combination.

12. The user equipment according to claim 7, wherein the first codebook to the $N^{th}$ codebook comprise at least one codebook used for phase compensation.

13. A network device comprising a transmitter and a receiver, both of which are coupled to a processor, wherein:

the transmitter is configured to cooperate with the processor to send indication information to user equipment, wherein the indication information comprises information about codebooks used by the user equipment to report precoding matrix indicators (PMI), the information about the codebooks indicates that the used codebooks are at least two of a first codebook to an $N^{th}$ codebook, the PMIs comprise at least two of a first PMI to an $N^{th}$ PMI, the first PMI to the $N^{th}$ PMI respectively indicate a precoding matrix in the first codebook to a precoding matrix in the $N^{th}$ codebook, and N is an integer greater than or equal to 2; and the receiver is configured to cooperate with the processor to receive the PMIs sent by the user equipment, wherein the first codebook to the $N^{th}$ codebook comprise at least one codebook used for inter-beam amplitude compensation.

14. The network device according to claim 13, further comprising:

the processor, configured to determine, for the user equipment, the codebooks used to report the PMIs.

15. The network device according to claim 13, wherein values of the first PMI to the $N^{th}$ PMI respectively correspond to one codebook index in the first codebook to one codebook index in the $N^{th}$ codebook.

16. The network device according to claim 13, wherein the first codebook to the $N^{th}$ codebook comprise at least one codebook used for beam selection.

17. The network device according to claim 13, wherein the first codebook to the $N^{th}$ codebook comprise at least one codebook used for beam basis vector selection.

18. The network device according to claim 13, wherein the first codebook to the $N^{th}$ codebook comprise at least one codebook used for beam combination.

19. The network device according to claim 13, wherein the first codebook to the $N^{th}$ codebook comprise at least one codebook used for phase compensation.

* * * * *